Jan. 3, 1939. W. T. MURDEN 2,142,574
ANTIFRICTION BEARING
Filed May 29, 1936

INVENTOR:
WILLIAM T. MURDEN,
BY Gales P. Moore
HIS ATTORNEY.

Patented Jan. 3, 1939

2,142,574

UNITED STATES PATENT OFFICE 2,142,574

ANTIFRICTION BEARING

William T. Murden, Bristol, Conn., assignor to General Motors Corporation, Detroit, Mich., a corporation of Delaware Application May 29, 1936, Serial No. 82,572

14 Claims. (Cl. 308—236)

This invention relates to antifriction bearings and comprises all of the features of novelty herein disclosed. An object of the invention is to provide improved means for securing a bearing race ring or the like against movement with respect to a supporting member. Another object is to provide a simple and efficient wedging device or adapter for clamping a race ring on a shaft.

To these ends and also to improve generally upon devices of this character the invention consists in the various matters hereinafter described and claimed. In its broader aspects, the invention is not necessarily limited to the specific construction selected for illustrative purposes in the accompanying drawing in which Fig. 1 is a sectional view taken axially of the bearing and adapter.

Figure 1:
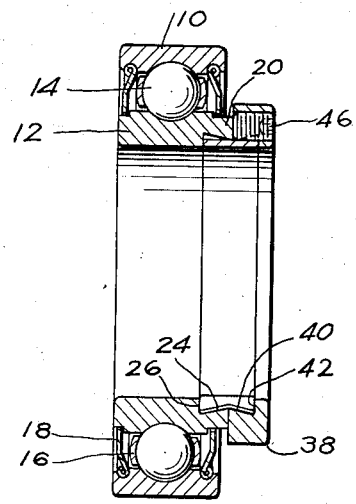
Figure 2:
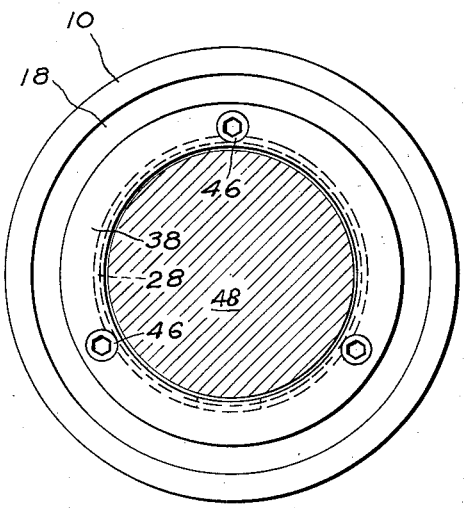
Fig. 2 is a side elevation with a supporting shaft in section.
Figure 3:
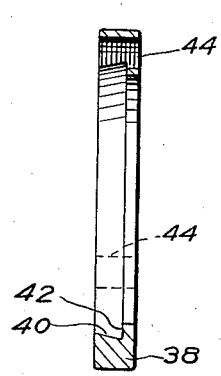
Fig. 3 is a sectional view taken axially of a wedging collar.
Figure 4:
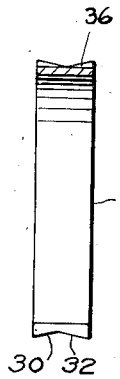
Fig. 4 is a sectional view taken axially of a split, wedging ring.
Figure 5:
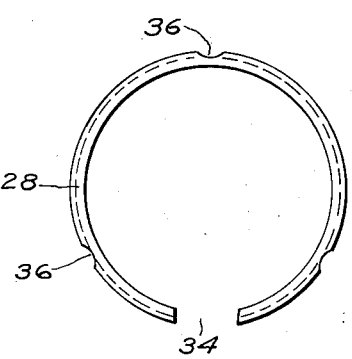
Fig. 5 is a side view of the ring of Fig. 4.

The numeral 10 indicates the outer race ring of an antifriction bearing having an inner race ring 12 provided with a raceway for a series of rolling elements 14 spaced by a separator 16. The space between the race rings is closed by suitable grease shields 18. The foregoing is merely illustrative of a suitable bearing to which the present invention may be applied.

When the inner race ring 12 is the one to be secured to a support, it is extended axially at 20 for co-operation with the securing means. The race ring has an undercut internal recess formed by a conical wall or taper 24 and a flat abutment wall or shoulder 26, the groove or recess thus formed being near one end of the bearing and entirely beyond the plane of the rolling elements 14 so that clamping forces applied to the race ring will not distort the raceway. A wedging ring 28 has its outer periphery formed with oppositely extending conical surfaces or tapers 30 and 32, the surface 30 being adapted to coact with the conical wall 24 to contract the ring which is preferably split as indicated at 34 and has inherent tendency to expand. The split ring is also provided with notches 36, preferably three in number, these notches extending across the ring and being shown as equally spaced.

Arranged in axial alignment with the race ring and surrounding a portion of the split ring is a wedging collar 38 having an internal undercut recess formed by a conical surface or taper 40 which terminates at a flat wall or shoulder 42, the surface 40 being adapted to coact with the correspondingly tapered surface 32 of the split ring to contract the ring. The undercut recesses in the collar and in the ring open into one another at a common plane at the end of the race ring projection 20. The collar has a plurality of threaded openings 44 for socket-headed screws 46 which register with the notches 36 of the split ring and abut against the end face of the projection 20. By turning the screws 46 to move them axially against the projection 20, the collar is forced axially away from a normal abutting engagement with the projection. The resultant separation of the conical walls 24 and 40 causes the latter to react on the tapered surfaces 30 and 32 to powerfully compress the split ring against a shaft 48 or similar supporting member.

The split ring has inherent tendency to expand to bring its bore into alignment with the bore of the race ring 12 so that the shaft 48, which is a little smaller than the bore, can be readily inserted initially, or the race ring, collar and split ring can be slipped over the shaft. This expansive tendency also holds the split ring against the race ring and the collar and it tends to urge the collar against the race ring so that all the parts are unit-handling prior to mounting on the shaft.

I claim:

1. In a device of the character described, a race ring and a collar arranged in end to end relation for relative axial displacement, the race ring and the collar having surfaces tapering in opposite directions from the adjacent ends thereof, a wedging member having correspondingly tapering surfaces, and means reacting between the collar and the race ring to forcibly displace such parts in an axial direction and thereby cause them to deflect the wedging member against a support; substantially as described.

2. In a device of the character described, a race ring and a collar arranged in end to end relation for relative axial displacement, the race ring and the collar having surfaces tapering in opposite directions, a wedging ring having correspondingly tapering surfaces, and a plurality of screws threaded in the collar and adapted to engage the race ring to forcibly separate the race ring and collar in an axial direction; substantially as described.

3. In a device of the character described, a race ring and a collar arranged in end to end relation for relative axial separation, the race ring and the collar having surfaces tapering in opposite directions, a split ring having correspondingly tapering surfaces and a plurality of slots interrupting said surfaces, the collar having threaded openings adapted to register with said slots, and screws in said slots and engaging the race ring; substantially as described.

4. In a device of the character described, a race ring and a collar arranged in end to end relation, the race ring and the collar having mating recesses opening into one another and provided with wedging surfaces tapering in opposite directions from a common plane at one end of the race ring, the tapering surface of the race ring being confined to a region near said end, a wedging member having correspondingly tapering surfaces to react with the tapering surfaces of both the race ring and the collar, and means whereby relative movement between the tapering surfaces of the wedging member and their cooperating tapering surfaces in the adjacent ends of the collar and the race ring causes contraction of the wedging member inside of both the collar and the recessed end of the race ring to wedge both said parts upon a supporting member; substantially as described.

5. In a device of the character described, a race ring and a collar arranged in end to end relation for relative axial displacement, the adjacent portions of the race ring and the collar having internal recesses which are open towards one another and have oppositely tapering surfaces, a wedging ring fitting in said recesses and having correspondingly tapered surfaces, the bore of the race ring and the bore of the wedging ring being in substantial alignment to slip over a shaft, and means for forcing the collar axially with respect to the race ring to cause the wedging ring to contract upon the shaft; substantially as described.

6. In a device of the character described, a race ring and a collar arranged in end to end relation, the race ring having an axial projection at one end, the projection and the collar having internal recesses which are open towards one another and taper down to a common plane at the adjacent ends of the collar and the projection, a wedging ring fitting in said recesses and having its bore in substantial alignment with the bore of the race ring, and means for causing the wedging ring to contract to make its bore smaller than that of the race ring; substantially as described.

7. In a device of the character described, a race ring having a raceway and an internal recess beyond the plane of the raceway and near one end of the ring, a wall of said recess tapering towards and meeting the adjacent end of the race ring, a collar at the same end of the ring and having an internal recess with a wall tapering towards the race ring and inclined in the opposite direction from the first mentioned tapering wall, a wedging member adapted to occupy said recesses and having tapering surfaces conforming to the tapering walls of the recesses, and means for forcing the collar axially with respect to the race ring; substantially as described.

8. In a device of the character described, a race ring having a raceway and a recess beyond the plane of the raceway, a wall of the recess tapering towards the adjacent end of the race ring, a wedging member having a tapering surface conforming to the wall of the recess, the wedging member being located at said adjacent end of the race ring and wholly beyond the plane of said raceway, and means at said adjacent end of the race ring for causing relative axial movement between the wedging member and the race ring to force the wedging member against a support; substantially as described.

9. In a device of the character described, a race ring having a raceway and an internal recess beyond the plane of the raceway, a wall of the recess tapering towards the adjacent end of the race ring, the recess and its tapering wall being confined to the region near said end and beyond the plane of the raceway, a wedging ring entering the recess and having a tapering wall conforming to the tapering wall of the recess, the bore of the wedging ring being in substantial alignment with the bore of the race ring, and means for axially shifting the wedging ring in the recess to cause the tapering surfaces to contract the wedging ring against a supporting shaft; substantially as described.

10. In a device of the character described, a race ring having a raceway and a recess beyond the plane of the raceway, a wall of the recess tapering towards the adjacent end of the race ring, a wedging member having a tapering surface conforming to the wall of the recess, a shiftable collar at said adjacent end of the race ring, and means carried by the collar and engaging the race ring for shifting the collar axially with respect to the race ring for thereby effecting a clamping action of the wedging member against a support; substantially as described.

11. In a device of the character described, a race ring having one end portion provided with an internal recess formed by a conical wall tapering towards a flat wall, a resilient wedging ring entering said recess and having a conical surface conforming to the conical wall with a flat surface to approach or recede from the flat wall, the bore of the race ring being in substantial alignment with the bore of the wedging ring, and of uniform size from said flat wall to the opposite end of the race ring, and means for forcing the wedging ring endwise to contract its bore upon a supporting shaft; substantially as described.

12. In a device of the character described, a race ring and a collar arranged in end to end relation for relative axial movement, the collar having a recess with a tapering surface, a wedging ring entering the recess and having a tapering wall conforming to the tapering wall of the recess, and means reacting between the race ring and the collar for causing relative axial movement thereof to change the distance between them and thereby deflect the wedging ring against a support; substantially as described.

13. In a device of the character described, a race ring and a continuous collar arranged in end to end relation for relative movement, the race ring having an annular internal recess near one end with a conical surface meeting said end of the ring, a wedging ring entering the recess and having a conical outer surface conforming to the conical wall of the recess, the bore of the race ring being in substantial alignment with the bore of the wedging ring, and means for moving the collar with respect to the race ring to cause the wedging ring to contract upon a supporting member; substantially as described.

14. In a device of the character described, a ring and a continuous circular collar arranged in end to end relation for abutment and for axial separation, the adjacent ends of the ring and the collar having undercut recesses opening into one another at a common plane at the adjacent ends of the ring and the collar, a spring ring fitting in said recesses and acting to urge the collar against the end of the ring, and means carried by the collar for forcibly separating it from the ring to thereby contract the spring ring upon a supporting shaft; substantially as described.

WILLIAM T. MURDEN.